(12) United States Patent
Thompson

(10) Patent No.: US 11,454,046 B1
(45) Date of Patent: Sep. 27, 2022

(54) SECURITY KEYPAD MOUNT ASSEMBLY

(71) Applicant: Kalen Thompson, Thompson Station, TN (US)

(72) Inventor: Kalen Thompson, Thompson Station, TN (US)

( * ) Notice: Subject to any disclaimer, the term of this patent is extended or adjusted under 35 U.S.C. 154(b) by 296 days.

(21) Appl. No.: 16/812,976

(22) Filed: Mar. 9, 2020

Related U.S. Application Data

(60) Provisional application No. 62/815,205, filed on Mar. 7, 2019.

(51) Int. Cl.
*F16M 13/00* (2006.01)
*E05B 17/00* (2006.01)
*F16M 13/02* (2006.01)
*E05B 49/00* (2006.01)

(52) U.S. Cl.
CPC .............. *E05B 17/00* (2013.01); *F16M 13/02* (2013.01); *E05B 49/00* (2013.01)

(58) Field of Classification Search
CPC .......... E05B 17/00; E05B 49/00; F16M 13/02

USPC .............................. 248/309.1, 551, 552, 553
See application file for complete search history.

(56) References Cited

U.S. PATENT DOCUMENTS

2010/0271808 A1* 10/2010 Gammell ................ E05B 17/10
362/100

FOREIGN PATENT DOCUMENTS

| GB | 2493255 A | * | 1/2013 | .............. B64F 1/366 |
| WO | WO-2006064467 A2 | * | 6/2006 | ......... E05B 19/0005 |

* cited by examiner

*Primary Examiner* — Todd M Epps
(74) *Attorney, Agent, or Firm* — Patterson Intellectual Property Law, P.C.; Mark A. Kilgore

(57) ABSTRACT

The present disclosure relates, in one embodiment to a security keypad mount assembly. The assembly may include a front and rear plate wherein the rear plate is slidably attached to the front plate to adjustability. The front plate may include slots for the rear plate to slide along. The front plater may further include through-holes for mounting the assembly to a door frame or building structure. The rear plate may include a chamber to allow a wire loom exiting a security keypad to be hidden and limit tampering when the security keypad and mount assembly are installed.

14 Claims, 7 Drawing Sheets

SECURITY KEYPAD MOUNT ASSEMBLY

CROSS-REFERENCES TO RELATED APPLICATIONS

This application claims benefit of the following patent application(s) which is/are hereby incorporated by reference: U.S. Provisional Application No. 62/815,205 filed on Mar. 7, 2019.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND SUMMARY

The present disclosure relates generally to an assembly for mounting a security keypad to a frame. More particularly, this invention pertains to an assembly that is adjustable for securely mounting a variety of differently sized security keypads onto frames or other structures.

Security keypads are known in the art and can be used to restrict and/or grant access to a building, office, room, or other structure. Often, the security keypad is located on the door frame, or adjacent the frame such that it is close enough so that a user can input the security code and then open the door within a small time frame, often on the scale of 1-5 seconds. If the door is not open in the allotted time, the lock will reengage, and entry to the structure or building may be denied. These security keypads may be wired into a locking system for the access door and when the correct access code is entered, the door locks will open for a limited amount of time allowing the user to open the door. When the door closes again, the lock is engaged until the correct access code is entered. For security purposes, the keypads should be securely mounted and be designed to prevent tampering with the unit as much as possible.

In some instances, a building or structure is designed so that there is not a suitable mounting position on or near the access door to allow a security pad to be properly mounted. For example, the front entrance of an office building may often have aluminum framing with glass housed between the frames. The aluminum frame pieces may be approximately 2 inches wide, which is inadequate to allow larger security keypads to be securely mounted to the frame. Because of the narrow width of the frame, it can be difficult to properly mount the keypad such that it is secured to the frame and placed in such a position that generally prevents tampering with the unit. In most cases, a keypad unit includes a wiring harness which exits the rear of the unit and is inserted into the frame behind the keypad so that the electrical wires remain hidden for both aesthetic purposes as well as to prevent tampering with the wires. Because of the narrow frame widths of some building structures, current practice is to use narrow keypads which have limited space for keys/buttons, thus limiting the number of options for unique keypad combinations.

What is needed, then, is a mounting assembly which allows for larger security keypads to be mounted on the narrow framing of a building or structure while still allowing the keypad to be securely mounted and to prevent tampering with the unit or the electrical wiring.

BRIEF SUMMARY

Briefly, the present disclosure relates, in one embodiment, to a security keypad mount assembly. The security keypad assembly may include a face plate and a rear plate. The face plate may include at least one through-hole configured to mount the face plate to a frame, at least one slot configured to allow the rear plate to be slidably fastened to the face plate, and an opening configured to allow a wire loom from the security keypad to pass through the face plate.

The rear plate may include at least one rear plate hole configured to align with the at least one slot of the face plate for slidably fastening the face plate to the rear plate, and an interior, the interior including a chamber, the chamber being partially closed having three walls formed in the interior of the rear plate and at least one opening.

In some embodiments, the assembly may include a face plate which may further include at least one mounting hole configured to allow a keypad mounting plate to be attached to the face plate.

In some embodiments, the at least one through-hole may include a plurality of through-holes.

In some embodiments, the at least one slot may include a plurality of parallel slots.

In some embodiments, the rear plate may include a plurality of rear plate holes configured to align with the plurality of parallel slots of the face plate for slidably fastening the face plate to the rear plate.

In some embodiments, the face plate opening may be centrally located.

In some embodiments, the plurality of parallel slots may be offset from the vertical axis of the face plate.

In some embodiments, a security keypad mount assembly may include a face plate and a rear plate. The face plate may include at least one through-hole configured to mount the face plate to a structure, a plurality of aligned openings disposed adjacent to each other, the aligned openings configured to allow the rear plate to be fastened to the face plate at a variety of positions, and an opening configured to allow a wire loom from the security keypad to pass through the face plate.

In some embodiments, the rear plate may include at least one rear plate hole configured to align with the at least one slot of the face plate for slidably fastening the face plate to the rear plate. The rear plate may also include an interior with the interior including a chamber. The chamber may be partially closed having three walls formed in the interior of the rear plate and at least one opening.

In some embodiments, the face plate may include at least one mounting hole configured to allow a keypad mounting plate to be attached to the face plate.

In one embodiment, the at least one through-hole may include a plurality of through-holes.

In some embodiments, the plurality of aligned openings may be disposed in a horizontal axis.

In some embodiments, the rear plate may include a plurality of rear plate holes configured to align with the plurality aligned openings of the face plate for fastening the face plate to the rear plate.

In some embodiments, the face plate opening may be centrally located.

In some embodiments, the plurality of aligned openings may be offset from the vertical axis of the face plate.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
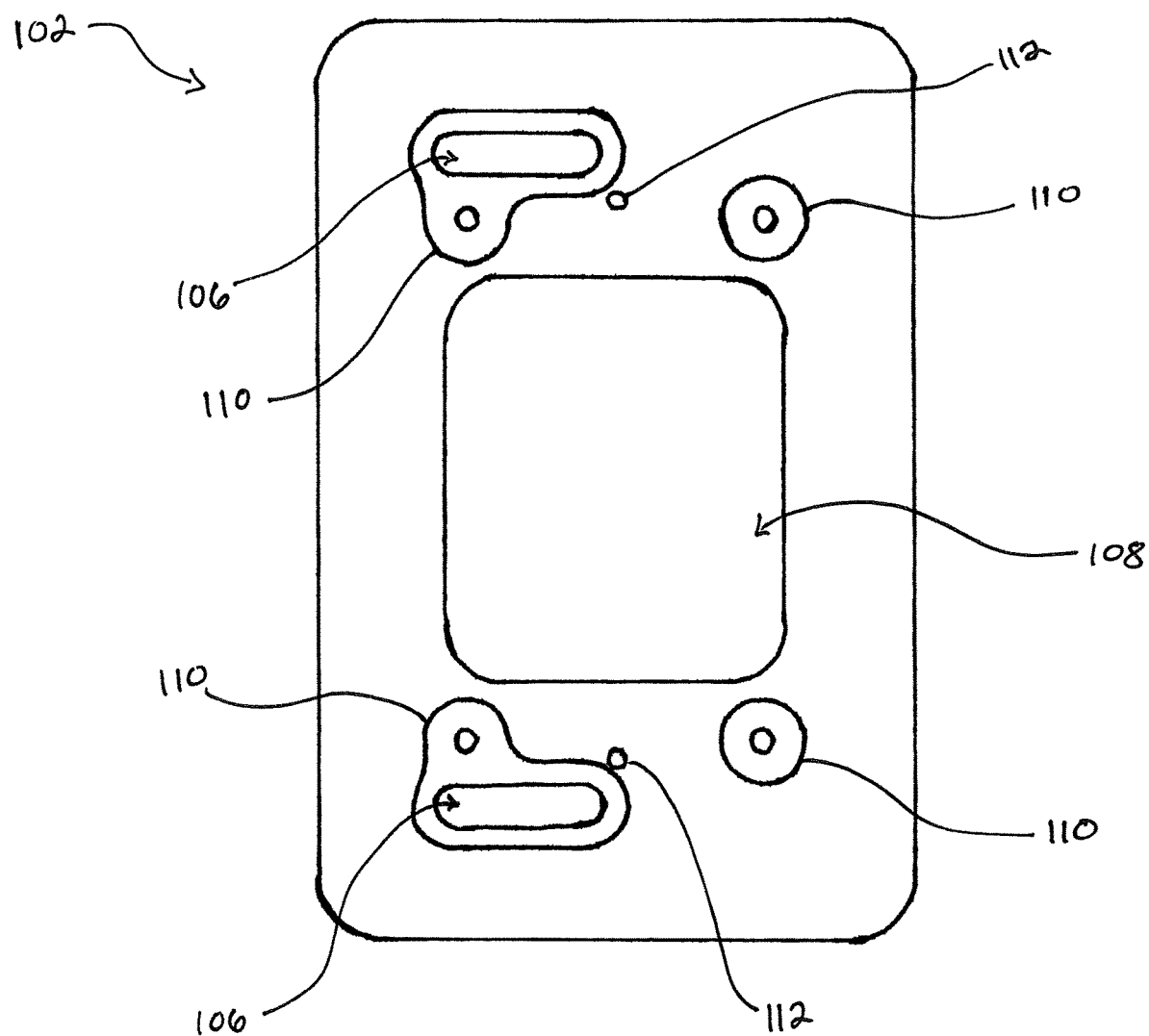
FIG. 1 is a front view of a face plate of a security keypad mount assembly.
Figure 2:
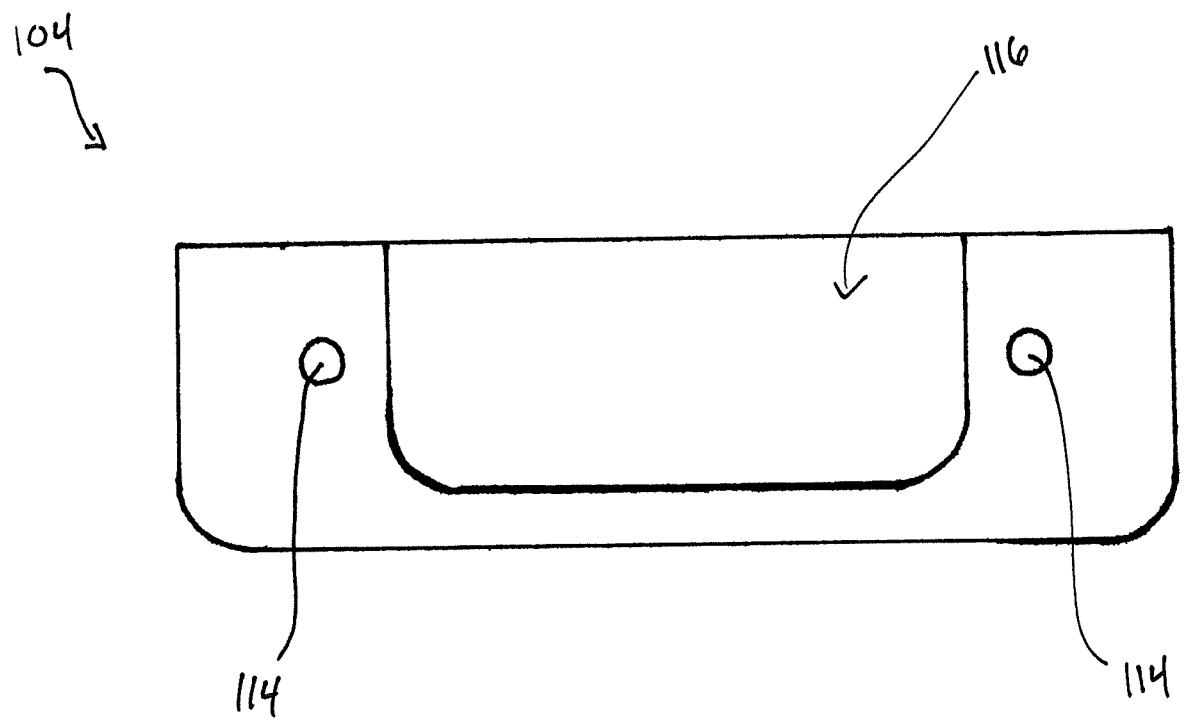
FIG. 2 is a top view of a rear plate of a security keypad mount assembly.

With reference to FIGS. 1 and 2, a security key mount assembly 100 is shown. Depicted in FIG. 14, the security key mount assembly 100 may be comprised of two pieces, a face plate 102 and a rear plate 104. As shown in FIG. 1, some embodiments of the present disclosure may include a face plate 102 having a plurality of slots 106, an opening 108, and a plurality of through-holes 110. Some embodiments may additionally include the face plate 102 having mounting holes 112. The mounting holes 112 may be used to allow a security keypad mounting plate to be attached to the face plate 102.

As shown in FIG. 1, in some embodiments the opening 108 may be centrally located. It will be understood that alternative locations of the opening 108 may be positioned at other locations on the face plate 102 dependent on the design of the security keypad being used. In some embodiments, the opening 108 may be offset to the left, right, top, or bottom to coincide with the position of the wire loom that exits the keypad in the back. The opening 108 may be configured to allow the wire loom from the security keypad to pass through the mount assembly 100 and be fed into the frame or other mounting surface. It will be generally understood that reference to the frame may include a door frame, housing frame, building frame, and/or a fascia. The frame may be of a metal or alloy such as aluminum or steel. In some embodiments, the frame may be brick, stone, concrete, or of some other material which may not have a smooth front fascia like that of metal. In order to properly limit access to the wire loom and therefore limit tampering with the security keypad, it is preferable that the wire loom be contained within the security mount assembly where the wire loom exits the security keypad and enters the building or structure.

Figure 6:
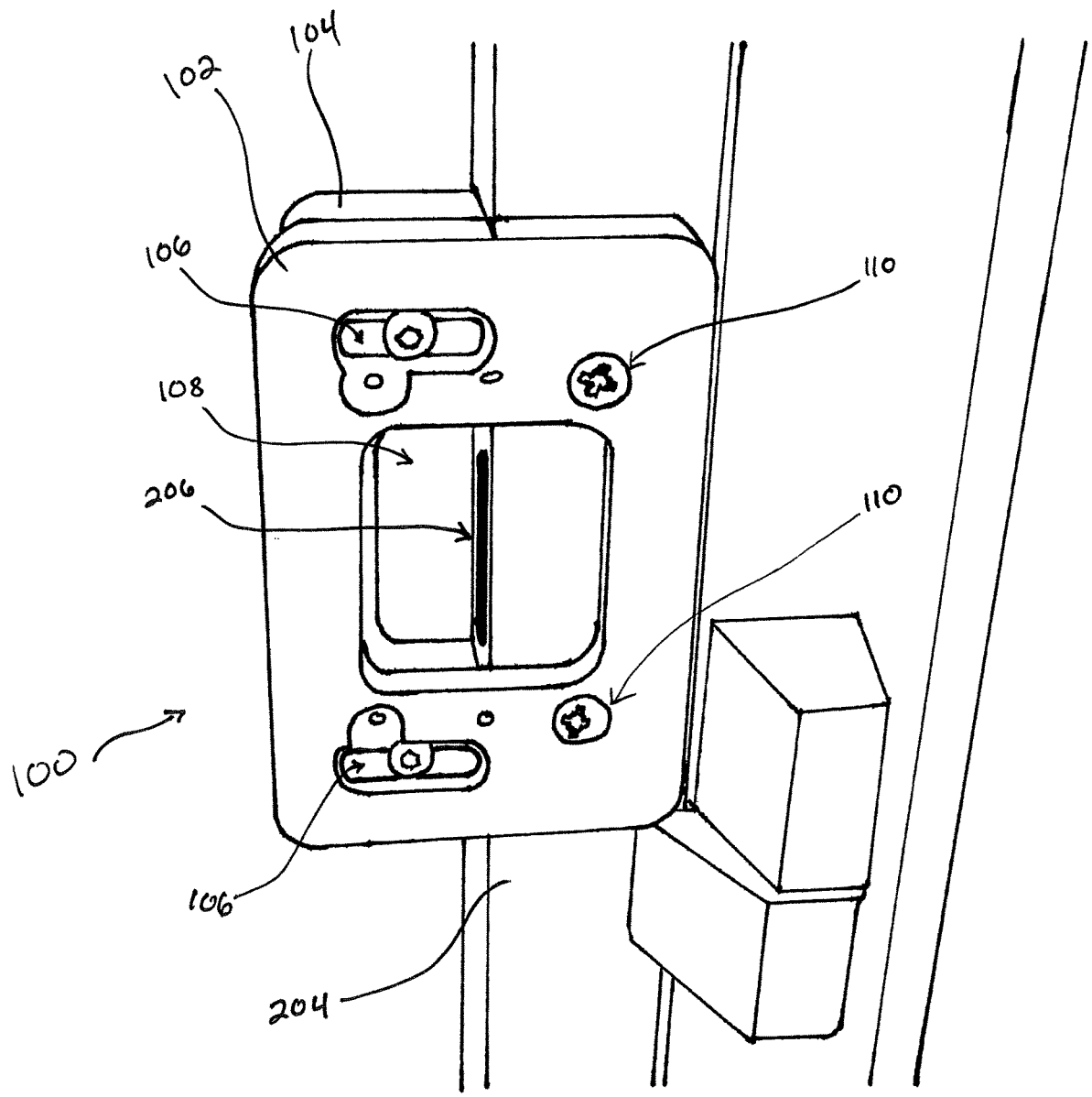
FIG. 6 is a perspective view of a security keypad mount assembly fastened to a door frame.

Referring to FIG. 6, in some embodiments a hole 206 in the frame 204 or other mounting surface may be present so that the wire loom from the security keypad may be fed into the frame and connected to the door locking mechanism or other security features. Thus, it will be understood by one skilled in the art that the opening 108 of the security mount assembly should be positioned so that it provides access for the wire loom to be routed into the frame 204 via the hole 206. As used herein, a security keypad may include an electronic interface that may utilize physical, wired, or wireless functions for access, including, but not limited to, physical keypad, electronic keypad, biometric scanner, magnetic strip reader, RFID, proximity scanner, RTLS, QR reader, barcode reader, Bluetooth low energy system, pattern recognition matching, and the like.

Referring now to FIG. 1, in some embodiments, the face plate 102 may include at least one through-hole 110 that may be used to mount the face plate 102 onto the frame 204 or other mounting surface. In some embodiments, the through-hole 110 may be countersunk or counterbored to allow for a fastener to be disposed below the outer surface of the face plate 102. Such an arrangement may allow for the security keypad to be mounted flush against the face plate 102 without the fastener interfering with the security keypad. It will be understood by one skilled in the art that the countersunk or counterbored hole may allow various types of fasteners to be used, including, but not limited to, hex bolts, socket bolts (or allen head bolts), flange bolts, button bolts, round-head screws, flat-head screws, and pan-head screws.

In one embodiment, as depicted in FIG. 1, a plurality of through-holes 110 may be located on the face plate 102. In some embodiments, the through-holes 110 may be positioned at complementary positions adjacent each corner of the opening 108. In this configuration, each pair of through-holes 110 may be used to fasten the face plate 102 to the frame or structure. Additional through-holes may be added at other various locations on the face plate to provide further strength and rigidity to the mounting of the face plate 102 to the frame. In other embodiments, it will be understood that a single through-hole 110 may be utilized to mount the face plate 102. In some embodiments, a single through-hole 110 may be utilized. In other embodiments, two through-holes 110 may be utilized and located at various positions depending on the frame design and the location that the face plate 102 will be mounted. Any number of through-holes 110 may be provided to allow for various mounting orientations and to allow for versatility when mounting the face plate 102 in different locations and on different types of structures.

As depicted in FIG. 6, one embodiment may include the face plate 102 fastened to the frame 204 via one pair of through-holes 110 positioned adjacent the upper right and lower right corners of the opening 108.

Figure 7:
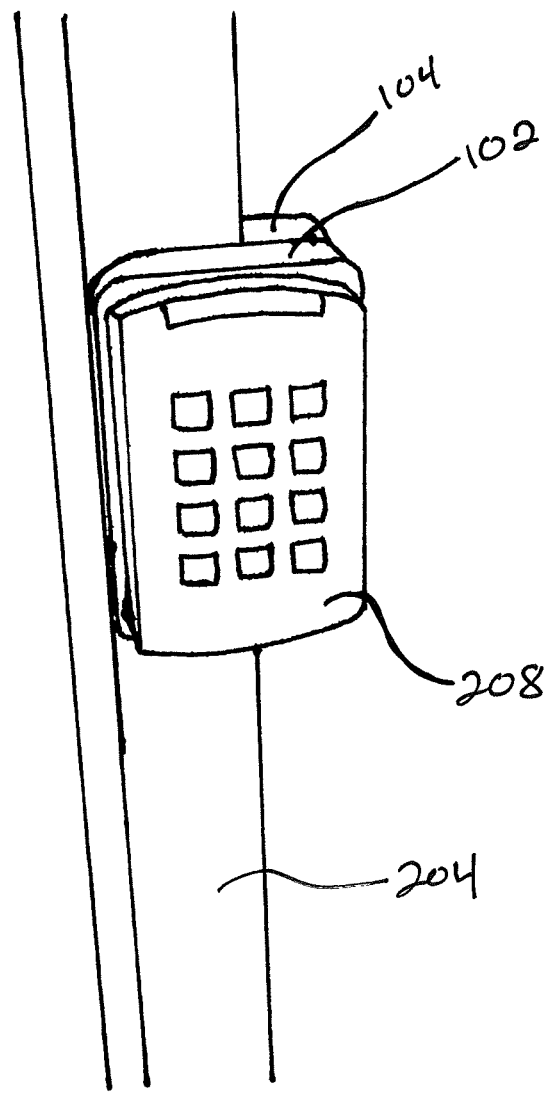
FIG. 7 is a is a perspective view of a security keypad mount assembly fastened to a door frame, with a security keypad attached to the mount assembly.

Referring now to FIG. 1, in one embodiment, the face plate 102 may also include mounting holes 112. In some embodiments, the mounting holes 112 may be threaded. Various styles of security keypads may be used with the security mount assembly 100. Each style of keypad may be mounted to the mount assembly 100 in a variety of ways. In some embodiments, the security keypad 208 may utilize a keypad mounting plate which may be fastened to some structure or mount, and then has provisions for the security keypad to be fastened to the mounting plate. This type of system allows for the security keypad 208 to be mounted and removed from the frame 204 or structure. (See FIG. 7) In some embodiments, the face plate 102 may provide at least one threaded mounting hole 112 to allow a screw or bolt to be inserted into the threaded mounting hole to fasten the keypad mounting plate to the face plate. The security keypad 208 may then be mounted to the mounting plate allowing the security keypad to be fastened securely in position on the frame 204 or structure.

In some embodiments, the face plate 102 may include a plurality of slots 106. In one embodiment, the plurality of slots 106 may include at least two slots. The slots 106 may be aligned parallel to each other but located on opposite sides of the opening 108 and offset to the left or right of the opening. In other embodiments, the slots 106 may be located adjacent to each other. The formation of the slots 106 may include elongate openings which work in tandem with the rear plate 104 to allow the rear plate to be slidably fastened to the face plate 102. The slots 106 may also be countersunk or counterbored to allow for the fastener to be positioned below the outer surface of the face plate 102. As mentioned before, this may allow the security keypad to be mounted flush against the face plate 102 without the fastener interfering with the security keypad. In some embodiments, the plurality of slots 106 may instead be a plurality of aligned holes that allow for various mounting positions of the rear plate 104 in relation to the face plate 102. In some embodiments, a single row of aligned holes may be utilized to allow for the rear plate to be positioned at each hole along the alignment axis. In some embodiments, multiple rows of aligned holes may be in columns, or positioned adjacent to other rows in an offset manner to allow various configurations of the rear plate 104 in relation to the face plate 102.

Figure 4:
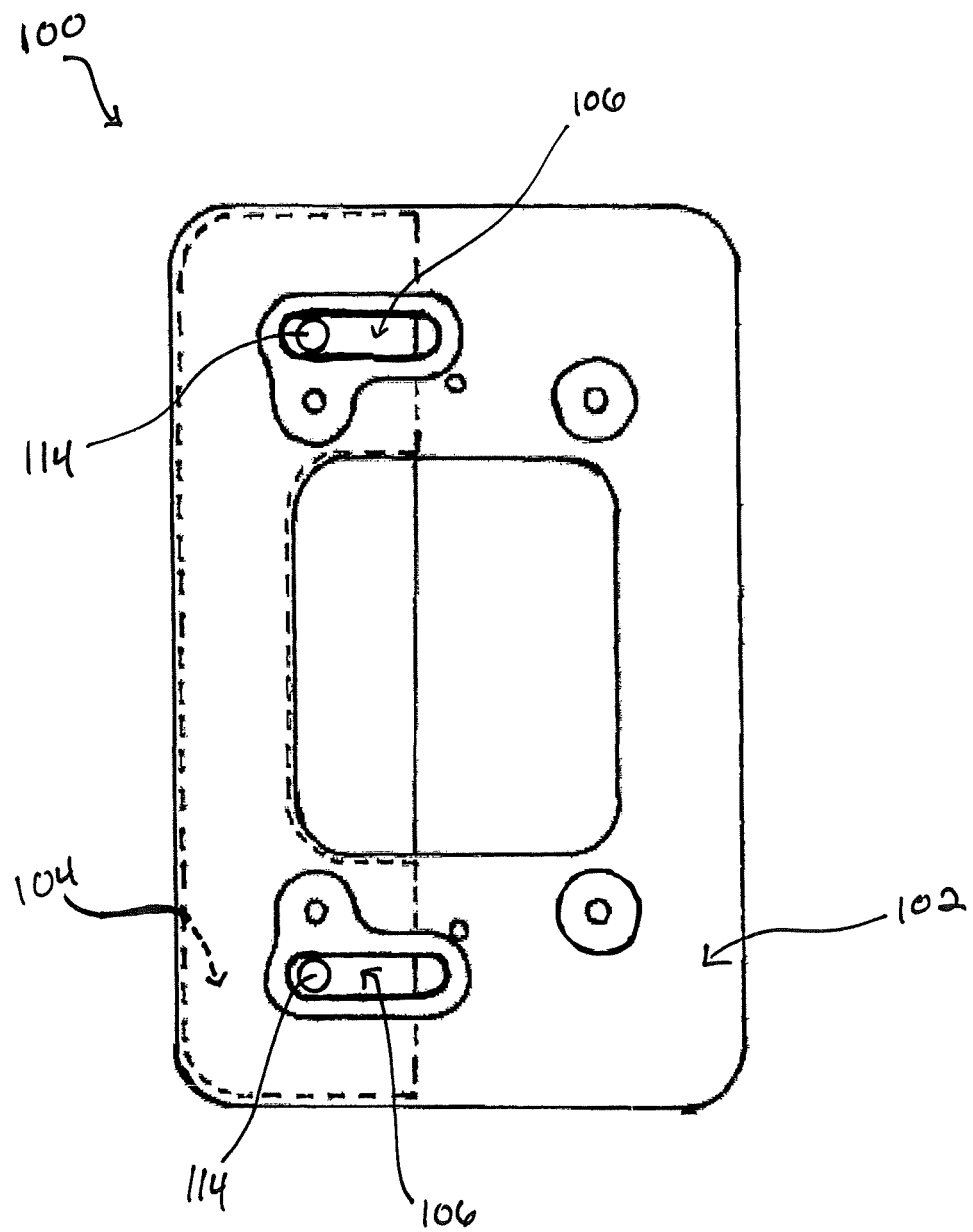
FIG. 4 is a front view of a face plate overlaying a rear plate.

As depicted in FIG. 4, in some embodiments, the slots 106 may align with a plurality of rear plate holes 114. The rear plate 104 may include a plurality of rear plate holes 114 that may be threaded and configured to receive a fastener such as a screw, bolt, anchor, or the like. Each of the slots 106 may align with each of the plurality of rear plate holes 114 such that the face plate 102 is positioned over the rear plate 104 and a fastener is inserted through each of the slots and into each of the rear plate holes. This configuration allows for the rear plate 104 to be slidably fastened to the face plate 102. During installation of the assembly 100 to the frame 204, the assembly may be placed onto the frame and the face plate 102 secured to the frame. The rear plate 104 may then be slidably moved along the slots 106 until it contacts the frame 204. Once the rear plate 104 is positioned, the fasteners inserted through the slots 106 and into the rear plate holes 114 may be secured so that the rear plate is secured to the face plate 102 and adjacent the frame 204 and can no longer be slidably moved. (See FIGS. 6 and 7).

Figure 3:
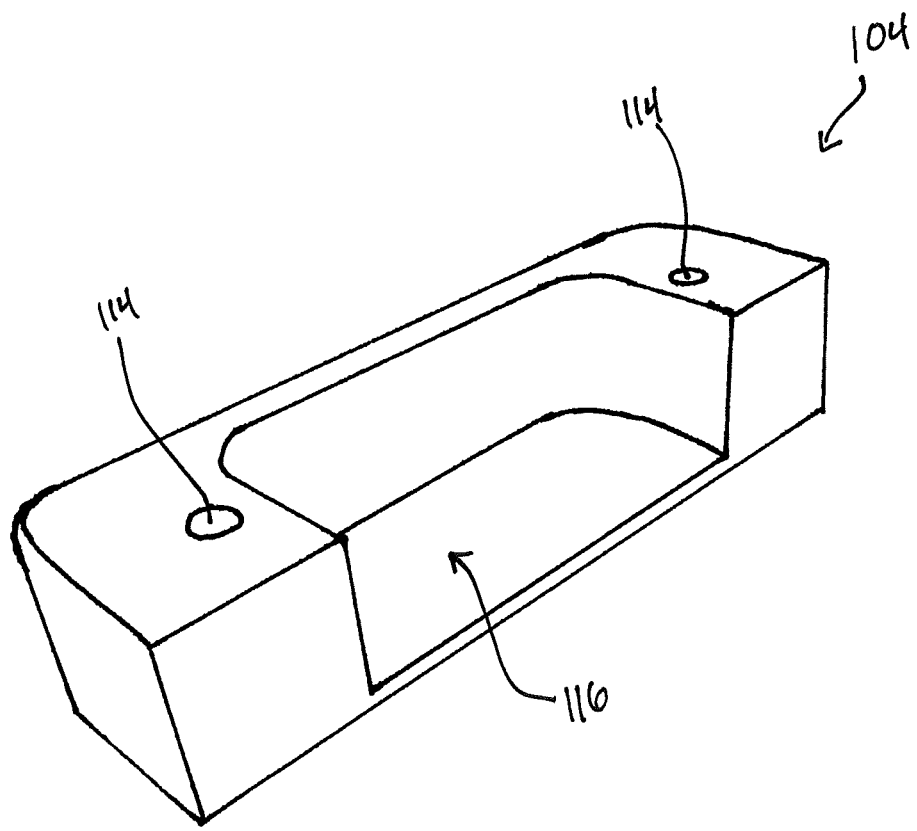
FIG. 3 is a perspective view of a rear plate of FIG. 2.
Figure 5:
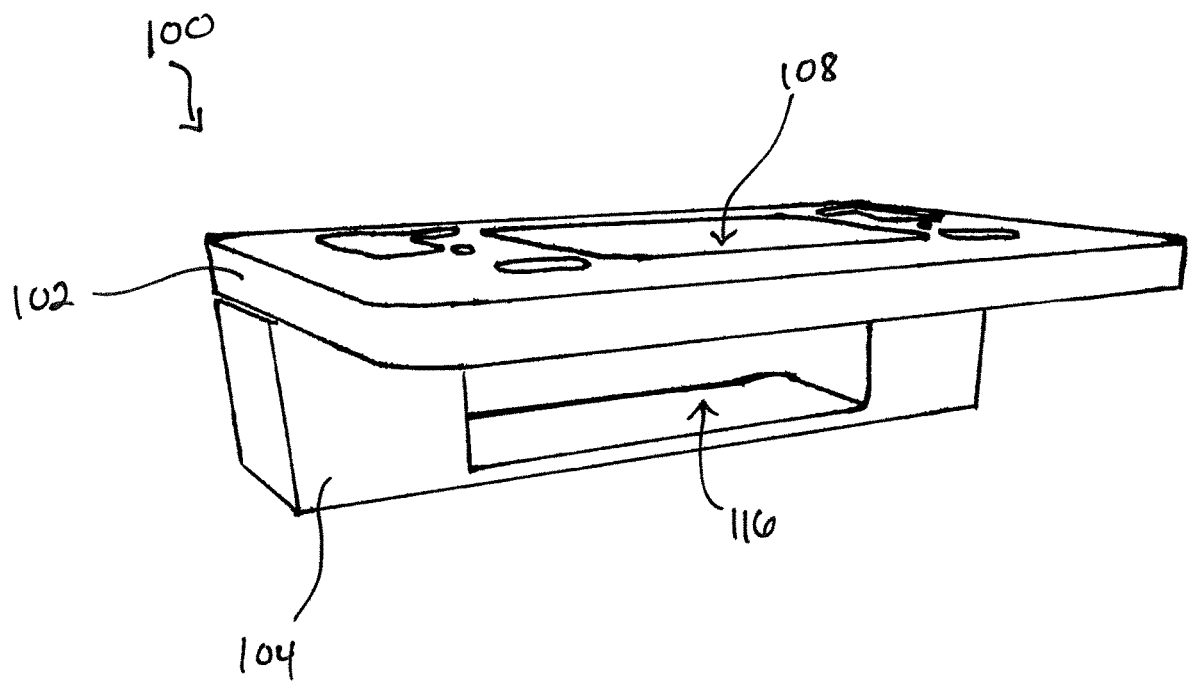
FIG. 5 is a perspective view of a face plate overlaying a rear plate.

Referring now to FIGS. 2 and 3, the rear plate 104 may include a chamber 116. In some embodiments the chamber 116 may be centrally located within the rear plate 104. The chamber 116 may include three walls formed in the interior portion of the rear plate 104 defining a partially closed chamber. (See also FIG. 5). In one embodiment, one side of the chamber 116 may have an opening. In some embodiments, this opening is positioned adjacent the frame 204 and allows the rear side of the face plate 102 and the wiring loom from the security keypad to be closed off and limits tampering with the system. The chamber 116 may configured to provide additional space for the wiring loom to be located before passing into the frame 204 or another mounting surface.

One advantage of the security key mount assembly is that the configuration of the various mounting holes, slots, and opening, is that the assembly may be rotated 180° on its central z-axis such that the rear plate may be positioned on either the left side or right side of the frame. This configuration allows a more universal placement of the assembly on different frames based on size, position, construction, and the like.

Thus, although there have been described particular embodiments of the present invention of a new and useful SECURITY KEYPAD MOUNT ASSEMBLY it is not intended that such references be construed as limitations upon the scope of this invention except as set forth in the following claim.

What is claimed is:

1. A security keypad mount assembly comprising:
   a face plate and a rear plate, the face plate comprising:
   at least one through-hole configured to mount the face plate to a frame;
   at least one slot configured to allow the rear plate to be slidably fastened to the face plate; and
   an opening configured to allow a wire loom from a security keypad to pass through the face plate;
   the rear plate comprising
   at least one rear plate hole configured to align with the at least one slot of the face plate for slidably fastening the face plate to the rear plate; and
   an interior, the interior including a chamber, the chamber being partially closed having three walls formed in the interior of the rear plate and at least one opening.

2. The assembly of claim 1, wherein the face plate further comprises at least one mounting hole configured to allow a keypad mounting plate to be attached to the face plate.

3. The assembly of claim 1, wherein the at least one through-hole comprises a plurality of through-holes.

4. The assembly of claim 1, wherein the face plate opening is centrally located.

5. The assembly of claim 1, wherein the at least one slot comprises a plurality of parallel slots.

6. The assembly of claim 5, wherein the rear plate includes a plurality of rear plate holes configured to align with the plurality of parallel slots of the face plate for slidably fastening the face plate to the rear plate.

7. The assembly of claim 5, wherein the plurality of parallel slots are offset from the vertical axis of the face plate.

8. A security keypad mount assembly comprising:
a face plate and a rear plate, the face plate comprising:
at least one through-hole configured to mount the face plate to a structure;
a plurality of aligned openings disposed adjacent to each other, the aligned openings configured to allow the rear plate to be fastened to the face plate at a variety of positions; and
an opening configured to allow a wire loom from a security keypad to pass through the face plate;
the rear plate comprising at least one rear plate hole configured to align with the at least one slot of the face plate for slidably fastening the face plate to the rear plate, and
an interior, the interior including a chamber, the chamber being partially closed having three walls formed in the interior of the rear plate and at least one opening.

9. The assembly of claim 8, wherein the face plate further comprises at least one mounting hole configured to allow a keypad mounting plate to be attached to the face plate.

10. The assembly of claim 8, wherein the at least one through-hole comprises a plurality of through-holes.

11. The assembly of claim 8, wherein the rear plate includes a plurality of rear plate holes configured to align with the plurality aligned openings of the face plate for fastening the face plate to the rear plate.

12. The assembly of claim 8, wherein the face plate opening is centrally located.

13. The assembly of claim 8, wherein the plurality of aligned openings are disposed in a horizontal axis.

14. The assembly of claim 13, wherein the plurality of aligned openings are offset from the vertical axis of the face plate.

* * * * *